(12) United States Patent  (10) Patent No.: US 6,173,339 B1
Yorimitsu  (45) Date of Patent: Jan. 9, 2001

(54) SYSTEM FOR MONITORING EXECUTION OF COMMANDS FROM A HOST FOR SHARED I/O DEVICES BY SETTING A TIME-OUT PERIOD BASED ON CONTROL PARAMETERS SENT BY THE HOST

(75) Inventor: Keiichi Yorimitsu, Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/154,651

(22) Filed: Sep. 17, 1998

(30) Foreign Application Priority Data

Dec. 26, 1997 (JP) .................................................... 9-361171

(51) Int. Cl.$^7$ ...................................................... G06F 13/14
(52) U.S. Cl. ................................. 710/5; 710/58; 710/260; 714/25; 714/48; 714/55
(58) Field of Search ................................... 710/5, 48, 58, 710/260; 714/25, 48, 55

(56) References Cited

U.S. PATENT DOCUMENTS

| | | | | |
|---|---|---|---|---|
| 5,471,564 | * | 11/1995 | Dennis et al. ........................ | 395/114 |
| 5,699,511 | * | 12/1997 | Porcaro et al. ......................... | 714/55 |
| 5,768,620 | * | 6/1998 | Johnson et al. ......................... | 710/15 |
| 5,894,583 | * | 4/1999 | Johnson et al. ......................... | 710/48 |
| 5,978,939 | * | 11/1999 | Mizoguchi et al. .................... | 714/55 |
| 6,012,154 | * | 1/2000 | Poisner ................................... | 714/55 |

FOREIGN PATENT DOCUMENTS

| | | |
|---|---|---|
| 53-36438 | 4/1978 | (JP) . |
| 53-84638 | 7/1978 | (JP) . |
| 57-207923 | 12/1982 | (JP) . |
| 63-193252 | 8/1988 | (JP) . |
| 2-311938 | 12/1990 | (JP) . |
| 6-19625 | 1/1994 | (JP) . |
| 7-210490 | 8/1995 | (JP) . |

* cited by examiner

Primary Examiner—Thomas C. Lee
Assistant Examiner—Abdelmoniem Elamin
(74) Attorney, Agent, or Firm—Greer, Burns & Crain, Ltd.

(57) ABSTRACT

A command execution monitoring system includes a first unit which retains control parameters of an operation control command sent by one of host computers, the control parameters including an operation completion time. A second unit sequentially receives command entries sent for input/output devices by the host computers and retains the command entries in a table, each entry including a relative elapsed time measured from a time the entry is retained in the table. A third unit sets a time-out period of one of the host computers at the operation completion time retained by the first unit, so that execution of each of the entries in the table of the second unit is monitored based on a comparison between each of the relative elapsed times of the entries and the operation completion time.

18 Claims, 10 Drawing Sheets

CONTROL PARAMETERS

| | |   |
|---|---|---|
| TIME DESIGNATION FIELD | OPERATION COMPLETION TIME (TIME-OUT PERIOD) | 21 |
| LUN DESIGNATION FIELD | LUN DESIGNATION (SPECIFIC LUN, ALL LUNS) | 22 |
| OPERATION DESIGNATION FIELD 1 | FIRST OPERATION DESIGNATION (FIRST OPTION, SECOND OPTION) | 23-1 |
| OPERATION DESIGNATION FIELD 2 | SECOND OPERATION DESIGNATION (LINK, READ TYPE, WRITE TYPE, ALL COMMANDS) | 23-2 |
| OPERATION DESIGNATION FIELD 3 | THIRD OPERATION DESIGNATION (FIRST OPTION, SECOND OPTION) | 23-3 |

| TIME | DESIGNATED |
|---|---|
| LUN | DESIGNATED |
| OP FIELD 1 | SECOND OPTION |
| OP FIELD 2 | ALL COMMANDS |
| OP FIELD 3 | FIRST OPTION |

FIG. 10B

| TIME | DESIGNATED |
|---|---|
| LUN | DESIGNATED |
| OP FIELD 1 | SECOND OPTION |
| OP FIELD 2 | ALL COMMANDS |
| OP FIELD 3 | SECOND OPTION |

FIG. 10C

| TIME | DESIGNATED |
|---|---|
| LUN | DESIGNATED |
| OP FIELD 1 | SECOND OPTION |
| OP FIELD 2 | DESIGNATED |
| OP FIELD 3 | FIRST OPTION |

FIG. 11A

| TIME | DESIGNATED |
|---|---|
| LUN | DESIGNATED |
| OP FIELD 1 | SECOND OPTION |
| OP FIELD 2 | DESIGNATED (LINK/RD/WR) |
| OP FIELD 3 | SECOND OPTION |

FIG. 11B

| TIME | DESIGNATED |
|---|---|
| LUN | DESIGNATED |
| OP FIELD 1 | FIRST OPTION |
| OP FIELD 2 | ALL COMMANDS |
| OP FIELD 3 | FIRST OPTION |

FIG. 11C

| TIME | DESIGNATED (=0) |
|---|---|
| LUN | DESIGNATED |
| OP FIELD 1 | FIRST OPTION |
| OP FIELD 2 | ALL COMMANDS |
| OP FIELD 3 | FIRST OPTION |

SYSTEM FOR MONITORING EXECUTION OF COMMANDS FROM A HOST FOR SHARED I/O DEVICES BY SETTING A TIME-OUT PERIOD BASED ON CONTROL PARAMETERS SENT BY THE HOST

BACKGROUND OF THE INVENTION (1) Field of the Invention

The present invention relates to a method and a system for monitoring execution of commands for input/output devices by using control parameters sent to a controller of the input-output devices by one of several host computers sharing the input/output devices in a computer system.

(2) Description of the Related Art

A computer system in which a plurality of peripheral units are externally connected to a plurality of host computers via a bus and the host computers share the peripheral units is known. The peripheral units include, for example, disk storage devices. Each peripheral unit includes a controller which connects the peripheral unit through the bus interface to the host computers.

In the above-mentioned computer system, one of the host computers sends an input/output (I/O) request for input/output devices of one of the peripheral units. The controller of the peripheral unit receives the I/O request, interprets it, and controls the execution of the command for the I/O devices. A LUN (logical unit number) is assigned to each of the I/O devices, and the controller recognizes each of the I/O devices in the peripheral unit by the LUN of the I/O request.

A controller which is provided with a command status.table retaining command entries from host computers in a computer system of the above-mentioned type is known.

When the controller receives an I/O request from one of the host computers, the controller interprets the I/O request, and adds the contents of the command to a command status table as a command entry. In the command status table, a number of command entries from the host computers are retained, and information necessary to manage the order of execution of individual command entries is defined.

After the command entry is retained in the command status table, the controller transmits a disconnection request to the host computer via the bus. The controller is temporarily disconnected from the host computer at a given time after the receipt of the disconnection request by the host computer.

After the disconnection is performed, the controller selects an appropriate command to be executed from the command entries of the command status table, and schedules the execution of the selected command. After this procedure, the controller transmits a reconnection request to the host computer. After the connection between the controller and the host computer is performed, the controller performs the execution of the selected command for the I/O device. After this, the controller transmits an I/O request completion notice to the host computer via the bus. When the controller has waited a certain length time for an answer of the I/O device to the request but has not received it after the time-out period, the controller transmits an I/O error notice to the host computer.

Japanese Laid-Open Patent Application No. 53-84638 discloses a monitoring system in which a CPU and I/O devices are connected by a controller. The controller is provided with a timer in which a fixed time-out.period is retained. The CPU sends an I/O request for one of the I/O devices through the controller. When the controller has waited the time-out period for an answer from the I/O device to the request but has not received it after the time-out period, the controller transmits an error signal to the CPU.

Japanese Laid-Open Patent Application No. 2-311938 discloses a memory device control system in which host computers and memory devices are connected by a controller. The controller is provided with timers for individual memory devices. In each timer, a fixed time-out period is retained. One of the host computers sends an access request for one of the memory devices through the controller. The controller monitors an elapsed time from the time the request is received. When the controller has waited the time-out period for an answer of the memory device to the request but has not received it after the time-out period, the controller stops the operation of the memory device, causing an abnormal end, and proceeds to a processing of a next access request received from the host computers.

However, in the controllers of the above-mentioned publications, the time-out period retained in the controller is a fixed length of time. If the fixed time-out period for the host computer is less than a time for the I/O device to complete the execution of the command, the controller automatically sends an error to the host computer before the execution of the command for the I/O device is complete. In such a case, the host computer cannot recognize the cause of the error.

Further, in a computer system which monitors execution of commands for input/output devices based on individual time-out periods of host computers sharing the I/O devices, the host computers generally operate on different operating systems and the time-out periods of the host computers may be different from each other. According to the controllers of the above-mentioned publications, it is difficult to effectively monitor the execution of all the commands sent by individual host computers. Practically, when a problem on the monitoring of the command execution with respect to a particular one of the host computers actually occurs, it is found that a countermeasure should be taken against the problem. In order to resolve the problem, the firmware of the controller must be substantially changed.

SUMMARY OF THE INVENTION

An object of the present invention is to provide an improved command execution monitoring method and system in which the above-mentioned problems are eliminated.

Another object of the present invention is to provide a command execution monitoring method which enables the monitoring of execution of commands for I/O devices sent from one of several host computers, which share the I/O devices, by setting a time-out period for that host computer at a desired value based on control parameters of a command sent from that host computer.

Still another object of the present invention is to provide a command execution monitoring system which enables the monitoring of execution of commands for input/output devices sent from one of several host computers, which share the devices, by setting a time-out period for that host computer at a desired value based on control parameters of a command sent from that host computer.

The above-mentioned objects of the present invention are achieved by a method of monitoring execution of input/output commands for input/output devices based on a time-out period of each of a plurality of host computers sharing the input/output devices, which comprises the steps of: retaining control parameters of an operation control command sent by one of the host computers, the control parameters including an operation completion time; sequentially receiving command entries sent by one of the host computers and retaining the command entries in a table, each entry including a relative elapsed time measured from a time the entry is retained in the table; and setting a time-out period of one of the host computers at the operation completion time, so that execution of each of the entries in the table is monitored based on a comparison between each of the relative elapsed times of the entries and the operation completion time.

The above-mentioned objects of the present invention are achieved by a system for monitoring execution of input/output commands for input/output devices based on a time-out period of each of a plurality of host computers sharing the input/output devices, comprising: a first unit which retains control parameters of an operation control command sent by one of the host computers, the control parameters including an operation completion time; a second unit which sequentially receives command entries sent by one of the host computers and retains the command entries in a table, each entry including a relative elapsed time measured from a time the entry is retained in the table; and a third unit which sets a time-out period of one of the host computers at the operation completion time retained by the first unit, so that execution of each of the entries in the table of the second unit is monitored based on a comparison between each of the relative elapsed times of the entries and the operation completion time.

According to the command execution monitoring system and method of the present invention, the user or the program on the host computer can transmit the operation control command wherein the control parameters (for example, a time-out period for the host computer) are set at arbitrary values according to the request of the user. The operation control commands are sent, to the command execution monitoring system at the same time as the issue of an I/O request to the I/O devices. It is possible for the command execution monitoring system and method of the present invention to effectively monitor the execution of the I/O command for the I/O devices in accordance with the designated control parameters of the operation control command.

Further, according to the command execution monitoring system and method of the present invention, it is possible to avoid the transmission of an I/O request error to the host computer before the execution of the command for the I/O device is complete. The command execution monitoring system and method of the present invention is effective in providing flexibility and reliability of the monitoring of the command execution for a computer system, which include various host computers sharing the I/O devices.

BRIEF DESCRIPTION OF THE DRAWINGS

Other objects, features and advantages of the present invention will be more apparent from the following detailed description when read in conjunction with the accompanying drawings in which.

DESCRIPTION OF THE PREFERRED EMBODIMENTS

A description will now be given of the preferred embodiments of the present invention with reference to the accompanying drawings.

Figure 1:
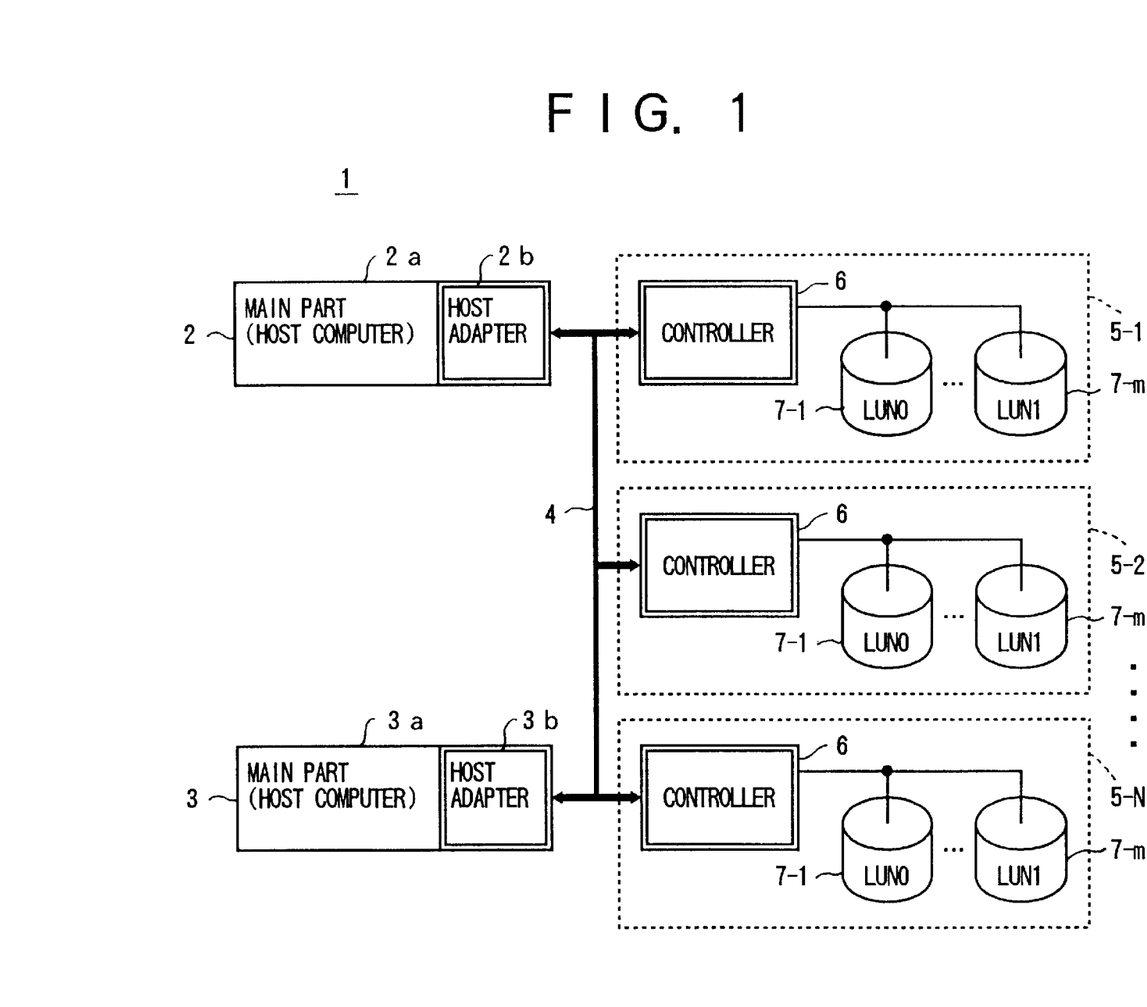
FIG. 1 is a block diagram showing a configuration of a computer system to which one embodiment of a command execution monitoring system of the present invention is applied.

FIG. 1 shows a configuration of a typical computer system to which one embodiment of a command execution monitoring system of the present invention is applied.

As shown in FIG. 1, in a computer system 1, a plurality of host computers 2, 3 are connected through a system bus 4 to a plurality of peripheral units 5-1 through 5-N. The peripheral units 5-1 through 5-N are shared by the host computers 2, 3 as the external equipment.

The plurality of host computers in the computer system 1 include at least the host computer 2 and the host computer 3. The host computer 2 includes a main part 2a and a host adapter 2b. The host computer 3 includes a main part 3a and a host adapter 3b. The host adapter 2b and the host adapter 3b respectively connect the host computer 2 and the host computer 3 with the bus 4 in response to a connection command sent by the main part 2a and the main part 3a.

Each of the peripheral units 5-1 through 5-N includes a controller 6 and a plurality of I/O devices 7-1 through 7-m connected to the controller 6. The controller 6 provides an interface between the bus 4 and the I/O devices 7-1 through 7-m of that peripheral unit. The controller 6 is capable of accessing each of the I/O devices 7-1 through 7-m and transmitting a result of I/O operation to the host computers.

The command execution monitoring system of the present invention is applied to each of the controllers 6 of the peripheral units 5-1 through 5-N in the computer system 1.

Hereinafter, for the sake of simplicity of description, one of the host computers 2 and 3, which transmits an I/O command or an operation control command to a controller in the computer system 1, will be called the host computer, and one of the controllers 6 of the peripheral units 5-1 through 5-N, which receives an I/O command or an operation control command sent by the host computer in the computer system 1, will be called the controller 6.

Figure 2:
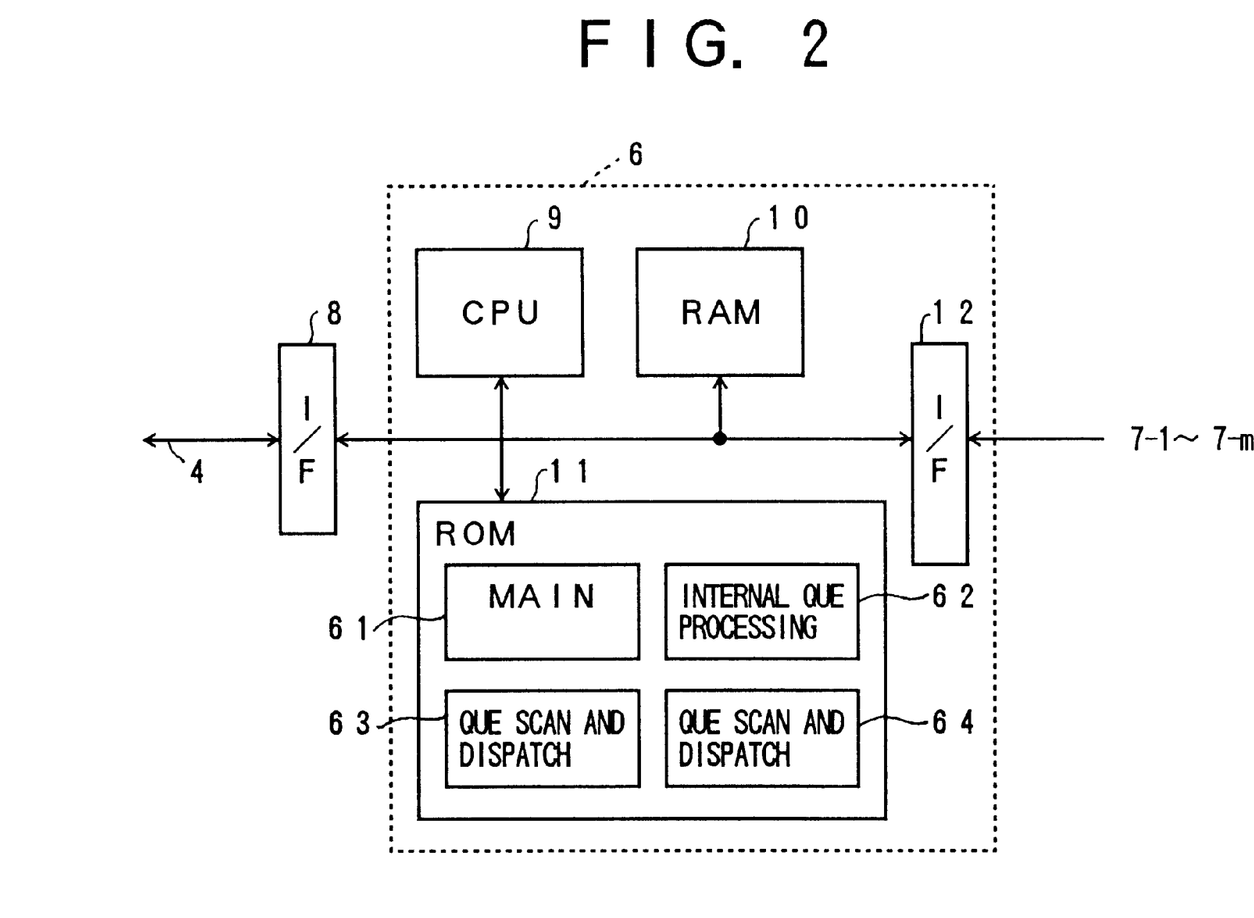
FIG. 2 is a block diagram showing a configuration of one embodiment of a controller of the present invention.

FIG. 2 shows a configuration of one embodiment of the controller 6 of the present invention.

As shown in FIG. 2, the controller 6 in the present embodiment includes an interface circuit 8 which connects the controller 6 with the system bus 4 to provide an interface between the host computer and the controller 6. A CPU (central processing unit) 9 carries out a procedure for monitoring execution of a command sent by the host computer, according to a program. A RAM (random access memory) 10 is a main memory of the CPU 10 and serves as a work memory available to the CPU 9 when a program is executed by the CPU 9. A ROM (read-only memory) 11 stores a plurality of programs 61 through 64 and other permanent information.

In the present embodiment, the programs stored in the ROM 11 include, as shown in FIG. 2, a main program 61, an internal que processing program 62, a que scan and dispatch processing program 63, and a que scan and dispatch processing program 64. These programs will be described later.

When a procedure for monitoring execution of a command from the host computer is started by the CPU 9, one of the programs 61 through 64 in the ROM 11 is transferred to the RAM 10, and the procedure is performed by the CPU 9 according to that program. An interface circuit 12 connects the controller 6 with the I/O devices 7-1 through 7-m via a data path when the data path between the controller 6 and the I/O devices 7-1 through 7-m is established.

In the present embodiment, the programs 61 through 64 are stored in the ROM 11 of the controller 6. However, it is not required that the programs be stored in the ROM 11 of the controller 6. For example, the programs in the form of files may be stored in a hard disk which is one of the I/O devices 7-1 through 7-m in the peripheral unit. In such a case, when a power switch of the peripheral unit is turned ON, the programs in the hard disk are partially or entirely loaded to the RAM 10 of the controller 6 and executed by the CPU 9.

Figure 3:
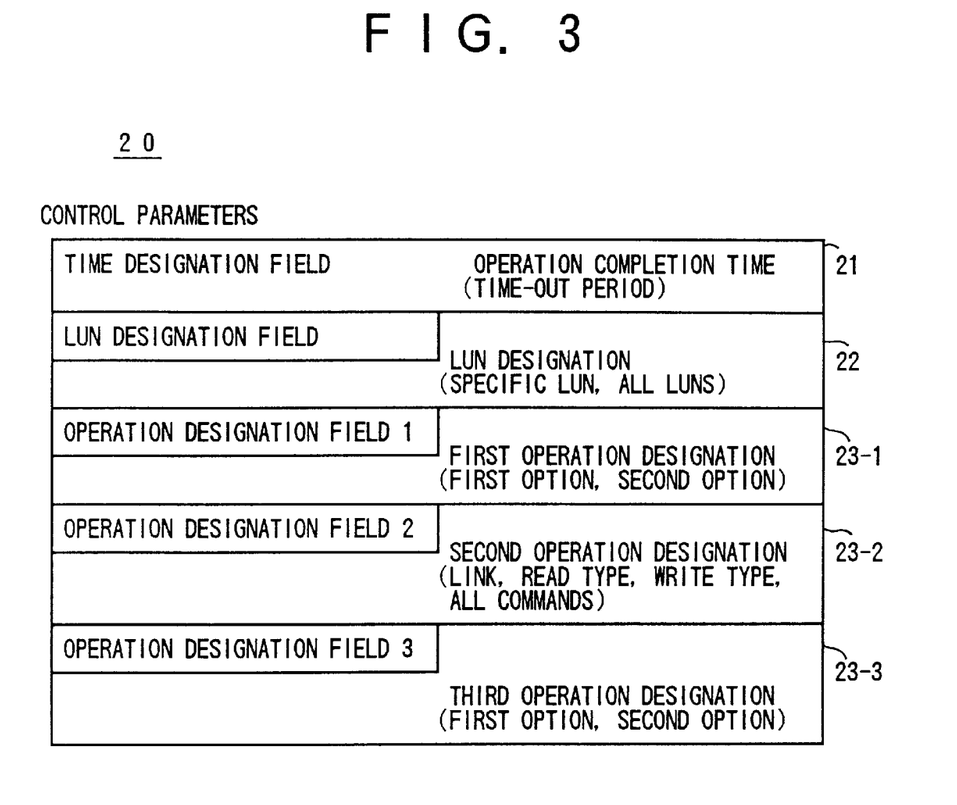
FIG. 3 is a diagram for explaining a format of an operation control command sent to a controller by a host computer in the computer system.

FIG. 3 shows a format of an operation control command sent to the controller 6 by the host computer in the computer system of FIG. 1. An operation control command 20 is generated by the host computer (or one of the host computers 2 and 3) as requested by the user, such that control parameters of the operation control command 20 are set at arbitrary values according to the request of the user. The operation control command 20 is transmitted from the host adapter of the host computer to the controller 6 via the bus 4. The operation control command 20 from the host computer is accepted by the controller 6 and stored in the RAM 10 of the controller 6.

As shown in FIG. 3, the operation control command 20 contains various control parameters. That is, in the operation control command 20, an operation completion time (or a time-out period) in a time designation field 21, an LUN (logical unit number) designation in an LUN designation field 22, a first operation designation in an operation designation field 23-1, a second operation designation in an operation designation field 23-2, and a third operation designation in an operation designation field 23-3 are contained.

The operation completion time (or the time-out period), which is set in the field 21 of the operation control command 20, is a control parameter representing a time-out period between the transmission of an I/O command by the host computer and the dispatch of the I/O command to the I/O device. Or the operation completion time may represent a tim-eout period for which the host computer checks for completion of an actual operation of the I/O device in response to the I/O command.

The LUN designation, which is set in the field 22 of the operation control command 20, is a control parameter indicating either a specific LUN or all the LUNs of the peripheral unit related to the controller 6, for which the operation completion time of the command 20 is made valid.

The first operation designation, which is set in the field 23-1 of the operation control command 20, is a control parameter indicating I/O commands for which the operation completion time set in the field 21 of the command 20 is made valid. The first operation designation in the field 23-1 of the command 20 indicates a first option that the operation completion time of the command 20 should be valid to any previous command entry existing in the controller 6 before the receipt of the command 20, or a second option that the operation completion time of the command 20 should be valid to all command entries stored in the controller 6 irrespective of the receipt of the command 20.

The second operation designation, which is set in the field 23-2 of the operation control command 20, is a control parameter representing a type of I/O commands for which the operation completion time in the field 21 of the command 20 is made valid. The second operation designation in the field 23-2 of the command 20 indicates a command linked after the operation control of the command 20, a read type, a write type, or all commands in the controller 6.

The third operation designation, which is set in the field 23-3 of the operation control command 20, is a control parameter representing an optional control of the operation completion time set in the field 21 of the operation control command 20. The third operation designation, set in the field 23-3 of the operation control command 20, indicates a first option that the operation of the I/O command should be done within the operation completion time, or a second option that the operation of the I/O command should be done just at the operation completion time.

In the computer system of FIG. 1, once a specific operation control command 20 from the host computer is received by the controller 6, a subsequent command execution control process is performed by the controller 6 in accordance with the control parameters of the operation control command 20.

Figure 4:
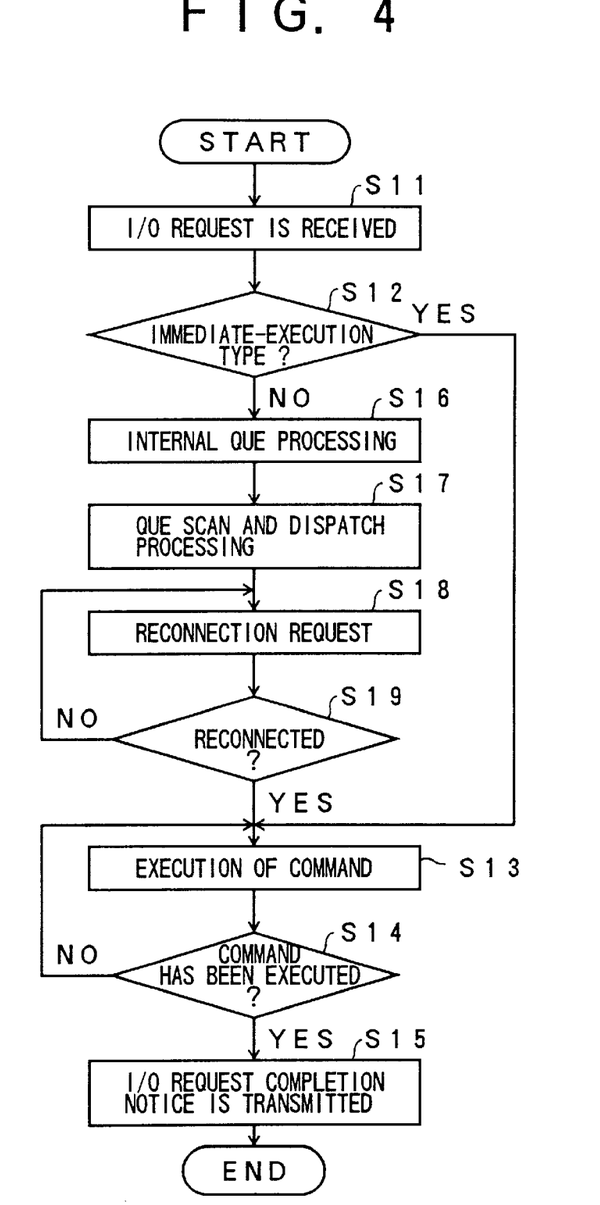
FIG. 4 is a flowchart for explaining a command execution monitoring process performed by the controller of the present invention.

FIG. 4 shows a command execution monitoring process performed by the controller 6 of the present invention. When a command from the host computer is received by the controller 6, the CPU 9 of the controller 6 transfers the main program 61 in the ROM 11 into the RAM 10, and executes the main program 61 so that the command execution monitoring process is performed by the CPU 9 of the controller 5 according to the main program 61.

When the operation control command 20 from the host computer is received by the controller 6, the control parameters of the command 20 are set in a portion of the RAM 10 and the command execution monitoring process is performed by the controller in accordance with the control parameters sent by the host computer.

As shown in FIG. 4, the CPU 9 at step S11 receives an I/O request (an I/O command or an operation control command 20) sent to the controller 6 by the host computer (one of the host computers 2, 3), interprets the I/O request, and acquires the contents of the command into the RAM 10.

After the step S11 is performed, the CPU 9 at step S12 detects whether the command sent by the host computer is an immediate-execution type.

When the command is an immediate-execution type, the CPU 9 at step S13 immediately performs execution of the command. In a given time after the step S13, the CPU 9 at step S14 detects whether the command has been executed. When the result at the step S14 is negative, the execution of the command at the step S13 continues. When the result at the step S14 is affirmative, the CPU 9 at step S15 transmits an I/O request completion notice to the host computer via the bus 4. After the step S15 is performed, the command execution monitoring process of FIG. 4 ends.

When the command is not an immediate-execution type, the CPU 9 at step S16 performs an internal que processing procedure. During the internal que processing procedure, a command entry of the command sent by the host computer is retained in a command status table of the RAM 10. In the command status table, a number of command entries are retained, and information necessary to manage the order of execution of individual command entries is defined.

Figure 5A:
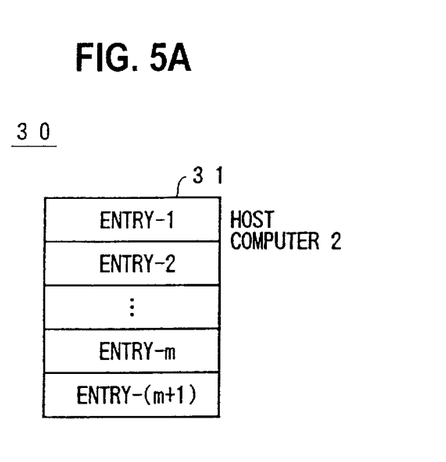
FIG. 5A and FIG. 5B are diagrams for explaining command status tables generated in the controller of the present invention.
Figure 5B:
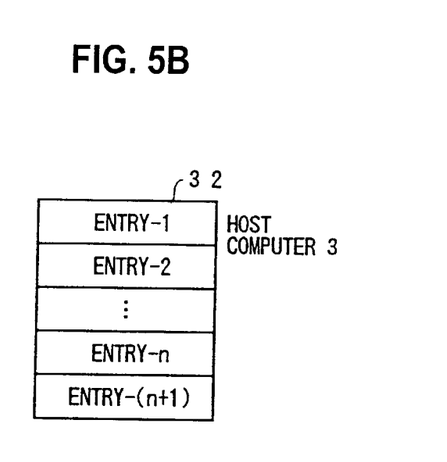

FIG. 5A and FIG. 5B show command status tables generated in the controller 6 during the command execution monitoring process of FIG. 4.

As shown in FIG. 5A and FIG. 5B, in a portion of the RAM 10 of the controller 6, a plurality of command status tables 30 are generated. The command status tables 30, generated in the RAM 10 of the controller 6, correspond to the individual host computers 2, 3 connected to the controller 6 via the bus 4 in the computer system 1. Hence, a single controller 6 can manage the order of execution of command entries from each of the host computers 2, 3 by using the command status tables 30.

Specifically, a command status table 31 is generated from command entries sent to the controller 6 by the host computer 2. In the command status table 31, the command entries ENTRY-1 through ENTRY-m (where m is an integer) are retained in the order of receipt of the command entries from the host computer 2. If a command entry from the host computer is newly received by the controller 6, the command entry ENTRY-(m+1) is generated and retained in the command status table 31 at a position following the previous final entry ENTRY-m. Similarly, a command status table 32 is generated from command entries sent to the controller 6 by the host computer 3. In the command status table 32, the command entries ENTRY-1 through ENTRY-n (where n is an integer) are retained in the order of receipt of the command entries from the host computer 3. If a command entry from the host computer 2 is newly received by the controller 6, the command entry ENTRY-(n+1) is generated and retained in the command status table 32 at a position following the previous final entry ENTRY-n.

Figure 6:
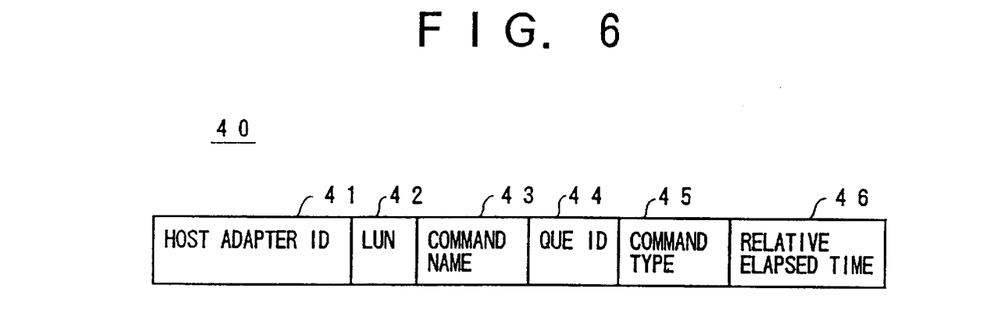
FIG. 6 is a diagram for explaining a format of a command entry of the command status tables.

FIG. 6 shows a format of a command entry of the command status tables 30 generated in the controller 6.

As shown in FIG. 6, a single command entry 40 includes a host adapter ID 41, a LUN (logical unit number) 42, a command name 43, a que ID 44, a command type 45, and a relative elapsed time 46. The host adapter ID 41 indicates an identification of the host adapter of the host computer which has transmitted the command. The LUN 42 indicates an identification of the I/D device in the peripheral unit which is accessed with the command. The command name 43 indicates an identification of the command sent by the host computer. The que ID 44 indicates an identification of the command status table 30 in which the command entry is retained. The command type 45 indicates a type of the command sent by the host computer. The relative elapsed time 46 indicates an elapsed time from the time the command entry is retained in the command status table 30.

When a command from the host computer is received by the controller 6, the controller 6 generates a command entry 40 as shown in FIG. 6, from the received command, and retains the command entry 40 in the command status table 30 (or a corresponding one of the command status tables 31, 32 for the host computer) of the RAM 10 as shown in FIG. 5A and FIG. 5B. After the command entry 40 is retained in the command status table 30, the controller 6 transmits a disconnection request to the host computer via the bus 4.

Referring back to FIG. 4, during the internal que processing procedure at the step S16, the controller 9 is disconnected from the host computer at a given time after the receipt of the disconnection request by the host computer. After the disconnection between the disconnection between the controller 6 and the host computer is performed, the CPU 9 of the controller 6 at step S17 performs a que scan and dispatch processing procedure at intervals of a predetermined time. During the que scan and dispatch processing procedure at the step S17, an appropriate command to be executed is selected from the command entries 40 of the command status table 30, and the execution of a selected command is scheduled.

After the step S17 is performed, the CPU 9 at step S18 transmits a reconnection request to the host computer which has sent the selected command to the controller 6. Hereinafter, that host computer will be called the related host computer.

The controller 6 is reconnected to the host computer via the bus 4 at a given time after the receipt of the reconnection request by the related host computer. The CPU 9 at step S19 detects whether the controller 6 has been reconnected to the related host computer. After the connection between the controller 6 and the related host computer is performed, the.CPU 9 at the step S13 performs the execution of the selected command. At the given time after the step S13, the CPU 9 at the step S14 detects whether the command has been executed. When the result at the step S14 is negative, the execution of the command at the step S13 continues. When the result at the step S14 is affirmative, the CPU 9 at the step S15 transmits an I/O request completion notice to the related host computer via the bus 4. After the step S15 is performed, the command execution monitoring process of FIG. 4 ends.

Figure 7:
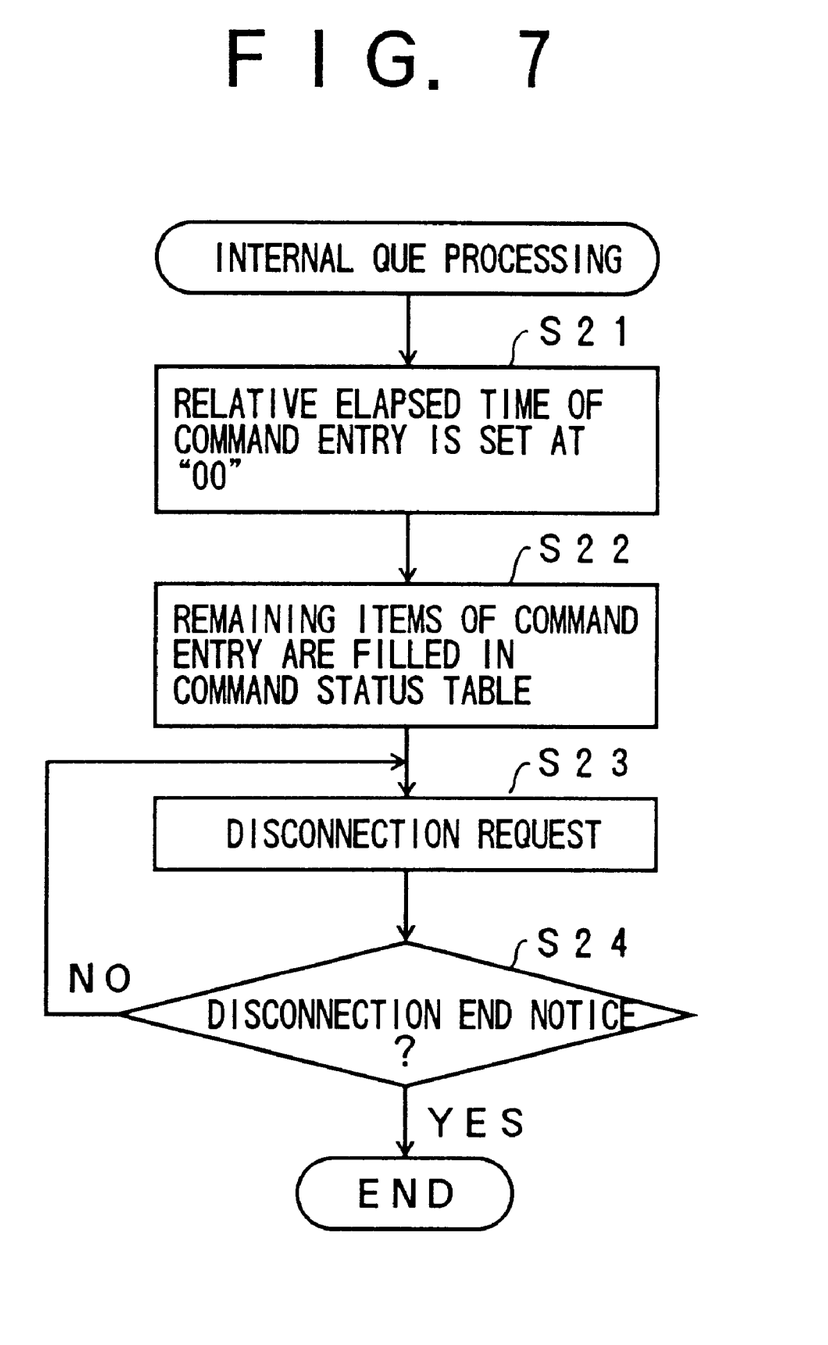
FIG. 7 is a flowchart for explaining an internal que processing procedure performed by the controller of the present invention.

FIG. 7 shows an internal que processing procedure performed by the controller 6 of the present invention.

Every time the I/O request from the host computer is received by the controller 6, the CPU 9 of the controller 6 transfers the internal que processing program 62 in the ROM 11 into the RAM 10, and executes the internal que processing program 62 so that the internal que processing procedure of FIG. 7 is performed by the CPU 9 according to the internal que processing program 62. The internal que processing procedure of FIG. 7 corresponds to the step S16 of the I/O command execution control process of FIG. 4. During the internal que processing procedure, a command entry for the received I/O request is retained in the command status table 30 existing in the RAM 10 of the controller 6. During the internal que processing procedure, the controller 6 is disconnected from the host computer.

As shown in FIG. 7, at the start of the internal que processing procedure, the CPU 9 of the controller 6 at step S21 generates a command entry 40 for the received I/O request and sets the relative elapsed time 46 of that command entry 40 at zero "00". That command entry 40 is added to a corresponding one of the command status tables 30 for the related host computer, existing in the RAM 10, at a position of the corresponding table following a previous final entry of the corresponding table 30. For example, if the host computer 2 transmits an I/O request to the controller 6, then the controller 6 adds the command entry 40 to the corresponding table 31 for the host computer 2 in the RAM 10. If the host computer 3 transmits an I/O request to the controller 6, then the controller 6 adds the command entry 40 to the corresponding table 32 for the host computer 3 in the RAM 10.

After the step S21 is performed, the CPU 9 at step S22 fills the remaining data items of the command entry 40 in the corresponding command status table 30. As described above with reference to FIG. 6, every command entry 40 includes the host adapter ID 41, the LUN 42, the command 43, the que ID 44 and the command type 45, in addition to the relative elapsed time 46. These data items of the new command entry 40 are determined and retained in the corresponding command status table 30 by the CPU 9.

After the step S22 is performed, the CPU 9 at step S23 transmits a disconnection request to the related host computer through the bus 4. The controller 6 is disconnected from the host computer at a given time after the receipt of the disconnection request by the host computer, and the host computer notifies the controller 6 that the disconnection of the controller 6 from the host computer is done in response to the disconnection request.

After the step S23 is performed, the CPU 9 at step S24 detects whether the disconnection end notice from the host computer has been received. When the result at the step S24 is negative, the step S24 is repeated. When the result at the step S24 is affirmative, the internal que processing procedure of FIG. 7 ends.

Figure 8:
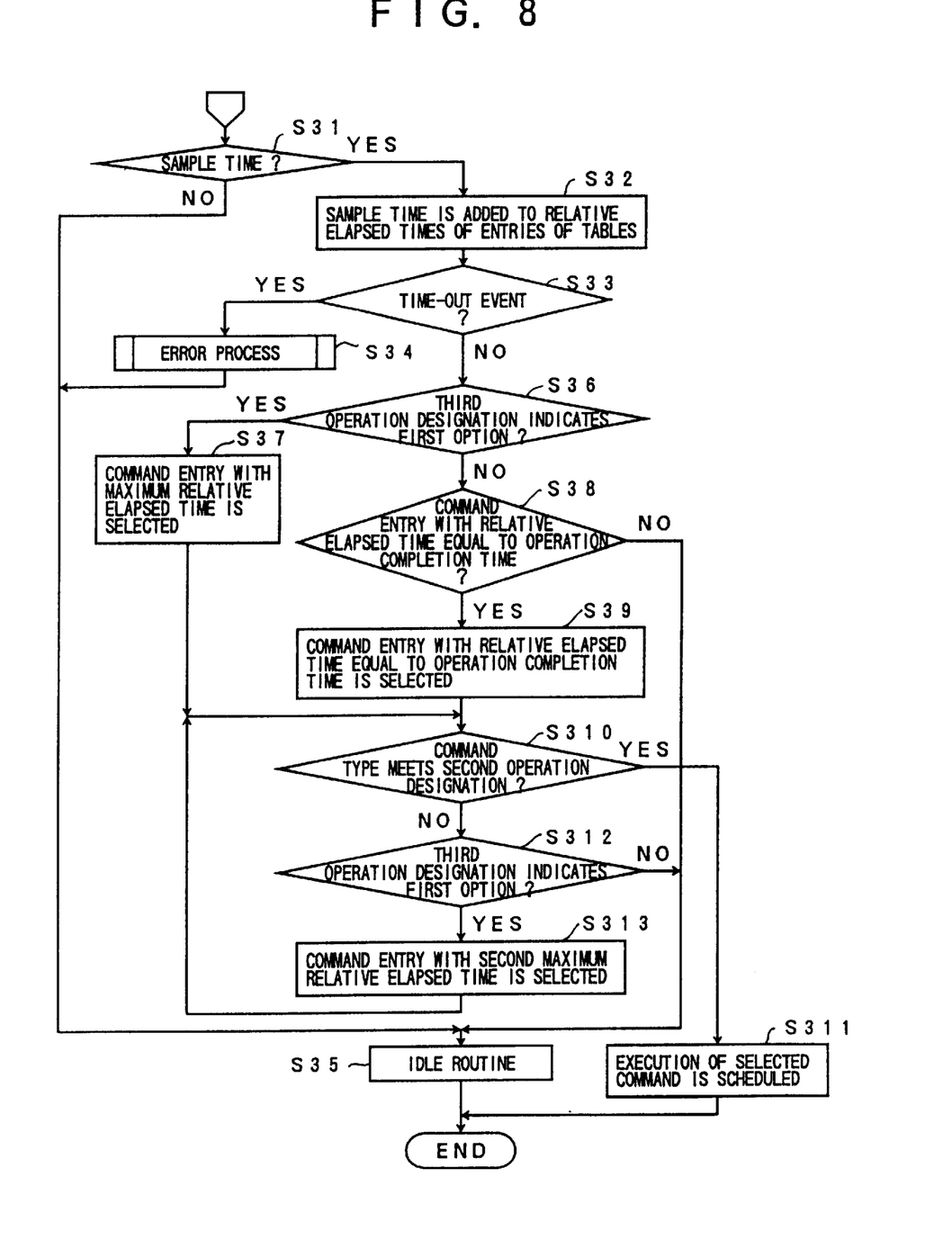
FIG. 8 is a flowchart for explaining a que scan and dispatch processing procedure performed by the controller as a part of an idle routine.

FIG. 8 shows a que scan and dispatch processing procedure performed by the controller 6 of the present invention as a part of an idle routine.

The que scan and dispatch processing procedure is performed by the CPU 9 of the controller 6 at intervals of a predetermined sample time "t". When the idle routine is started, the CPU 9 of the controller 6 transfers the que scan and dispatch processing program 63 of the ROM 11 into the RAM 10, and executes the que scan and dispatch processing program 63 so that the que scan and dispatch processing procedure of FIG. 8 is performed according to the que scan and dispatch processing program 63. The que scan and dispatch processing procedure of FIG. 8 corresponds to the step S17 of the command execution control process of FIG. 4.

In the following description of the que scan and dispatch processing procedure of FIG. 8, it is assumed that the operation control command 20 from the host computer is already received by the controller 6 and the que scan and dispatch processing procedure is subsequently performed by the controller 6 based on the control parameters of the operation control command 20 stored in the RAM 10.

As shown in FIG. 8, the CPU 9 of the controller 6 at step S31 detects whether the sample time "t" has elapsed. In the present embodiment, the sample time "t" is predetermined based on a clock supplied to the controller 6. When the result at the step S31 is affirmative, the CPU 9 performs a next step S32. When the result at the step S31 is negative, the CPU 9 performs other procedures of the idle routine (step S35).

The CPU 9 at step S32 adds the sample time "t" to the relative elapsed times 46 of all the entries 40 in the command status tables 30 existing in the controller 6.

After the step S32 is performed, the CPU 9 at step S33 detects whether a time-out event has occurred in the entries 40 of the command status tables 30, by comparison between each of the relative elapsed times 46 of the entries 40 and the designated operation completion time of the operation control command 20 (or any of the relative elapsed times>the operation completion time).

When the result at the step S33 is affirmative, it is determined that the relative elapsed time 46 of the related command entry 40 exceeds the designated operation completion time but the related command is not yet executed. The CPU 9 at step S34 performs an error process for the related command.

During the error process, the CPU 9 recognizes the host computer which has transmitted the related command to the controller 6, by making reference to the host adapter ID 41 of the related command entry 40. The CPU 9 transmits a reconnection request to the host adapter of the host computer which accords with the host adapter ID 41 of the related command entry 40. After the reconnection between the host computer and the controller 6 is performed in response to the reconnection request (corresponding to the step S19 in FIG. 4), the CPU 9 of the controller 6 will notify the host computer of occurrence of a time-out error for the related command. After the step S34 is performed, the CPU 9 at the step S35 performs the procedures of the idle routine, and the transmission of the reconnection request and the notification of the time-out error to the host computer are performed within the idle routine.

When the result at the step S33 is negative, it is determined that no time-out event has occurred in the entries 40 of the command status tables 30. The CPU 9 at step S36 detects whether the third operation designation in the field 23-3 of the operation control command 20 indicates the first option that the operation of the I/0 command should be done within the operation completion time.

When the result at the step S36 is affirmative, it is determined that the first option (or the operation should be done within the operation completion time) is indicated by the control parameter in the field 23-3 of the operation control command 20. The CPU 9 at step S37 selects one of the entries 40 of the command status tables 30 that has the maximum relative elapsed time 46. After the step S37 is performed, the CPU 9 performs a next step S310, which will be described later.

When the result at the step S36 is negative, it is determined that the second option (or the operation should be done just at the operation completion time) is indicated by the control parameter 23-3 of the operation control command 20. The CPU 9 at step S38 detects whether there is a command entry, in the entries 40 of the command status tables 30, that has the relative elapsed time 46 equal to the operation completion time of the field 21 of the command 20.

When the result at the step S38 is negative, there is no command entry, in the entries 40 of the command status tables 30, that has the relative elapsed time 46 equal to the operation completion time. Hence, it is determined that there is no command to be executed in the entries 40 of the command status tables 30. The CPU 9 at the step S35 performs the procedures of the idle routine.

When the result at the step S38 is affirmative, there is a command entry, in the entries 40 of the command status tables 30, that has the relative elapsed time 46 equal to the operation completion time. The CPU at step S39 selects that command entry in the entries 40 of the command status tables 30 the relative elapsed time 46 of which is equal to the operation completion time.

After the step S37 or the step S39 is performed, the related command entry 40, including the elements 41 through 46 shown in FIG. 6, is selected from the command status tables 30. The CPU 9 at step S310 detects whether the command type 45 of the selected command entry 40 meets the second operation designation set in the field 23-2 of the operation control command 20.

When the result at the step S310 is affirmative, the CPU 9 at step S311 schedules the execution of the selected command for the execution in a subsequent idle routine. After the step S311 is performed, the CPU 9 will perform the steps S18 and S19 and the steps S13 through S15, shown in FIG. 4, within the subsequent idle routine, in order for the execution of the selected command for the I/O devices and the transmission of the I/O request completion notice to the host computer.

When the result at the step S310 is negative, the CPU 9 at step S312 detects whether the third operation designation in the field 23-3 of the operation control command 20 indicates the first option that the operation of the I/O command should be done within the operation completion time.

When the result at the step S312 is affirmative, it is determined that the first option (or the operation should be done within the operation completion time) is indicated by the control parameter in the field 23-3 of the operation control command 20. The CPU 9 at step S313 selects one of the entries 40 of the command status tables 30 that has the second maximum relative elapsed time 46. After the step S313 is performed, the CPU 9 again performs the step S310. The steps S310 through S313 are repeated until the step S310 results in the affirmative answer. Through the steps S310 through S313, the command entry which meets the control parameter (or the second operation designation) of the operation control command 20 is selected for the execution.

When the result at the step S312 is negative, it is determined that the second option (or the operation should be done just at the operation completion time) is indicated by the control parameter 23-3 of the operation control command 20. Hence, it is determined that there is no candidate for the command to be executed in the command status tables 30. The CPU 9 at the step S35 performs the procedures of the idle routine.

In the above-described procedure of FIG. 8, it is assumed that the operation control command 20 from the host computer is already received by the controller 6 and the que scan and dispatch processing procedure is subsequently performed by the controller 6 based on the control parameters of the operation control command 20 stored in the RAM 10. However, it is also possible for the controller 6 of the present invention to perform another que scan and dispatch processing procedure upon receipt of the operation control command 20 from the host computer. Hence, a user or a program on the host computer can transmit the operation control command 20 to the controller 6 at the same time as the issue of an I/O request to the I/O devices.

Figure 9:
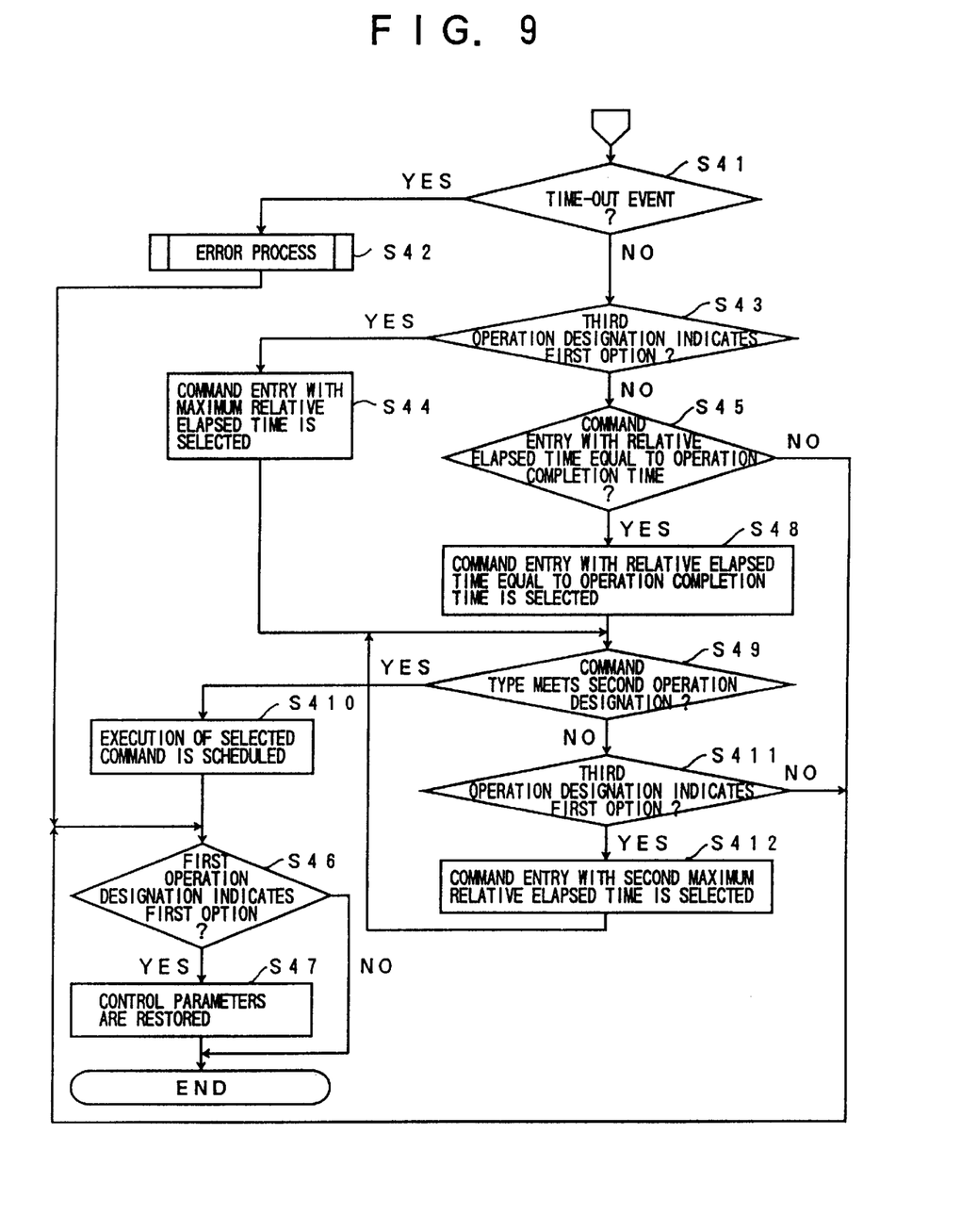
FIG. 9 is a flowchart for explaining a que scan and dispatch processing procedure performed by the controller upon receipt of an operation control command from a host computer.

FIG. 9 shows a que scan and dispatch processing procedure performed by the controller 6 upon receipt of the operation control command 20 from the host computer.

When the operation control command 20 from the host computer is received, the CPU 9 of the controller 6 transfers the que scan and dispatch processing program 64 of the ROM 11 into the RAM 10, and executes the que scan and dispatch processing program 64 so that the que scan and dispatch processing procedure of FIG. 9 is performed according to the que scan and dispatch processing program 64. The que scan and dispatch processing procedure of FIG. 9 corresponds to the step S17 of the command execution control process of FIG. 4.

As shown in FIG. 9, the CPU 9 of the controller 6 at step S41 detects whether a time-out event has occurred in the entries 40 of the command status tables 30, by comparison between each of the relative elapsed times 46 of the entries 40 and the designated operation completion time in the field 21 of the operation control command 20 (or any of the relative elapsed times>the operation completion time).

When the result at the step S41 is affirmative, it is determined that the relative elapsed time 46 of the related command entry 40 exceeds the designated operation completion time but the related command is not yet executed. The CPU 9 at step S42 performs an error process for the related command.

During the error process, the CPU 9 recognizes the host computer which has transmitted the related command to the controller 6, by making reference to the host adapter ID 41 of the related command entry 40. The CPU 9 removes the related command entry 40 from the corresponding one of the command status tables 30 for that host computer. The CPU 9 schedules the transmission of a reconnection request and the notification of a time-out error to the host computer for the idle routine. Within the idle routine, the CPU will transmit a reconnection request to the host adapter of the host computer which accords to the host adapter ID 41 of the related command entry 40. After the reconnection between the host computer and the controller 6 is performed in response to the reconnection request (corresponding to the step S19 in FIG. 4), the CPU 9 of the controller 6 will notify the host computer of the occurrence of a time-out error for the related command.

After the step S42 is performed, the CPU 9 performs a next step S46, which will be described later.

When the result at the step S41 is negative, it is determined that no time-out event has occurred in the entries 40 of the command status tables 30. The CPU 9 at step S43 detects whether the third operation designation in the field 23-3 of the operation control command 20 indicates the first option that the operation of the I/O command should be done within the operation completion time.

When the result at the step S43 is affirmative, it is determined that the first option (or the operation should be done within the operation completion time) is indicated by the control parameter in the field 23-3 of the operation control command 20. The CPU 9 at step S44 selects one of the entries 40 of the command status tables 30 that has the maximum relative elapsed time 46. After the step S44 is performed, the CPU 9 performs a next step S49, which will be described later.

When the result at the step S43 is negative, it is determined that the second option (or the operation should be done just at the operation completion time) is indicated by the control parameter 23-3 of the operation control command 20. The CPU 9 at step S45 detects whether there is a command entry, in the entries 40 of the command status tables 30, that has the relative elapsed time 46 equal to the operation completion time of the field 21 of the command 20.

When the result at the step S45 is negative, there is no command entry, in the entries 40 of the command status tables 30, that has the relative elapsed time 46 equal to the operation completion time. Hence, it is determined that there is no command to be executed in the entries 40 of the command status tables 30. The CPU 9 at step S46 detects whether the first option (or the operation completion time of the command 20 should be valid to any previous command entire exiting in the controller 6 before the receipt of the command 20) is indicated by the control parameter 23-1 of the command 20.

When the result at the step S46 is affirmative, the CPU 9 at step S47 makes the control parameters of the command 20 in the RAM 10 invalid and restores the previous control parameters in the RAM 10 before the receipt of the command 20. After the step S47 is performed, the que scan and dispatch processing procedure of FIG. 9 ends. When the result at the step S46 is negative, the que scan and dispatch processing procedure of FIG. 9 ends and the step S47 is not performed.

When the result at the step S45 is affirmative, there is a command entry, in the entries 40 of the command status tables 30, that has the relative elapsed time 46 equal to the operation completion time. The CPU at step S48 selects that command entry in the entries 40 of the command status tables 30, the relative elapsed time 46 of which is equal to the operation completion time.

After the step S44 or the step S48 is performed, the related command entry 40, including the elements 41 through 46 shown in FIG. 6, is selected from the command status tables 30. The CPU 9 at step S49 detects whether the command type 45 of the selected command entry 40 meets the second operation designation set in the field 23-2 of the operation control command 20.

When the result at the step S49 is affirmative, the CPU 9 at step S410 schedules the dispatch of the selected command for the execution in a subsequent step. After the step S410 is performed, the CPU 9 performs the above-described steps S46 and S47. After the steps S46 and S47 are performed, the que scan and dispatch processing procedure of FIG. 9 ends.

When the result at the step S49 is negative, the CPU 9 at step S411 detects whether the third operation designation in the field 23-3 of the operation control command 20 indicates the first option that the operation of the I/O command should be done within the operation completion time.

When the result at the step S411 is affirmative, it is determined that the first option (or the operation should be done within the operation completion time) is indicated by the control parameter in the field 23-3 of the operation control command 20. The CPU 9 at step S412 selects one of the entries 40 of the command status tables 30 that has the second maximum relative elapsed time 46. After the step S412 is performed, the CPU 9 again performs the step S49. The steps S49 through S412 are repeated until the step S49 results in the affirmative answer. Through the steps S49 through S412, the command entry which meets the control parameter (or the second operation designation) of the operation control command 20 is selected for the execution.

When the result at the step S411 is negative, it is determined that the second option (or the operation should be done just at the operation completion time) is indicated by the control parameter 23-3 of the operation control command 20. Hence, it is determined that there is no candidate for the command to be executed in the command status tables 30. The CPU 9 performs the above-described steps S46 and S47.

According to the above-described procedure of FIG. 9, the user or the program on the host computer can transmit the operation control command 20 wherein the control parameters (e.g., the operation completion time) are set at arbitrary values according to the request of the user, to the controller 6 at the same time as the issue of an I/O request to the I/O devices. It is possible for the controller 6 of the present invention to effectively monitor the execution of the I/O command for the I/O devices in accordance with the designated control parameters of the command 20.

Figure 10A:
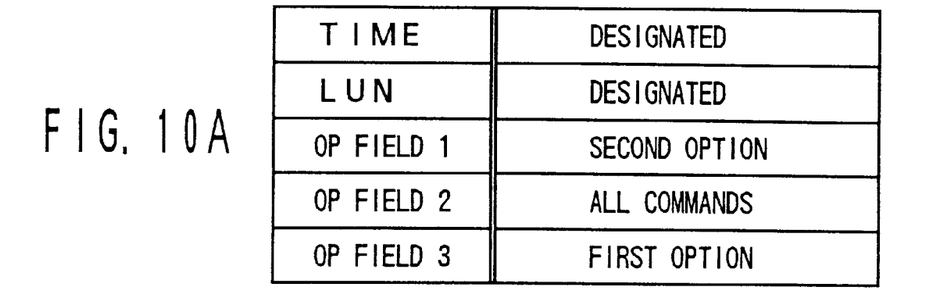
FIG. 10A, FIG. 10B and FIG. 10C are diagrams for explaining some examples of control parameters of the operation control command.
Figure 10B:
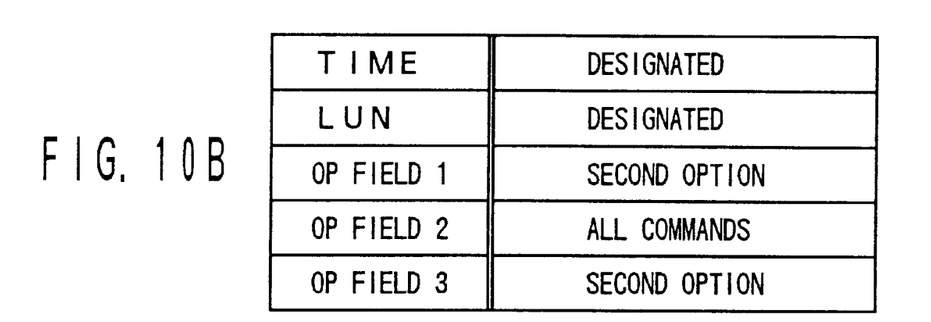
Figure 10C:
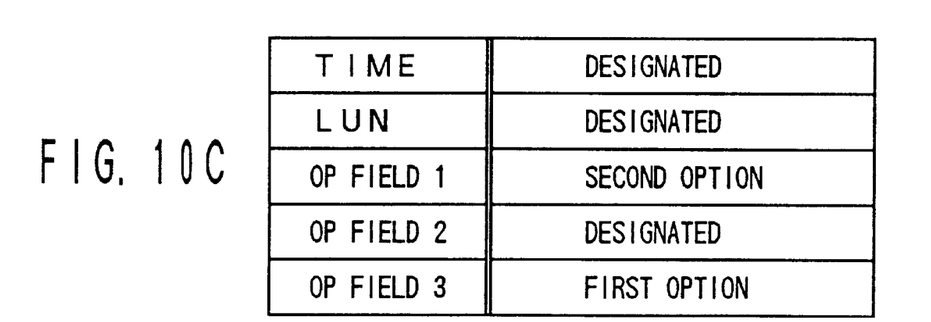

FIG. 10A, FIG. 10B and FIG. 10C show some examples of the control parameters of the operation control command in order to explain the functions of the command execution monitoring system and method of the present invention.

In the example of FIG. 10A, a specific time-out period for the host computer can be set to the controller 6 by using the control parameters of the operation control command 20 sent by the host computer. The operation completion time in the field 21 of the command 20 is designated to a specific time according to the request of the user. The LUN designation in the field 22 of the command 20 is set at a specific LUN. The first operation designation in the field 23-1 of the command 20 is set to the second option. The second operation designation in the field 23-2 of the command 20 is set to all the commands. The third operation designation in the field 23-3 of the command 20 is set to the first option. By transmitting the operation control command 20 of this example to the controller 6, the designated operation completion time is made valid to all the commands for the specific LUN sent by the host computer.

In the example of FIG. 10B, the second option that the operation of all the commands is done just at the designated operation completion time, can be set to the controller 6 by using the control parameters of the operation control command 20 sent by the host computer. The operation completion time in the field 21 of the command 20 is designated to a specific time according to the request of the user. The LUN designation in the field 22 of the command 20 is set at a specific LUN. The first operation designation in the field 23-1 of the command 20 is set to the second option. The second operation designation in the field 23-2 of the command 20 is set to all the commands. The third operation designation in the field 23-3 of the command 20 is set to the second option. By transmitting the operation control command 20 of this example to the controller 6, the designated second option is made valid to all the commands for the specific LUN sent by the host computer.

In the example of FIG. 10C, a specific command type of the commands for a specific LUN to which the designated operation completion time is made valid, can be set to the controller 6 by using the control parameters of the operation control command 20 sent by the host computer. The operation completion time in the field 21 of the command 20 is designated to a specific time according to the request of the user. The LUN designation in the field 22 of the command 20 is set at a specific LUN. The first operation designation in the field 23-1 of the command 20 is set to the second option. The second operation designation in the field 23-2 of the command 20 is set at a specific command type. The third operation designation in the field 23-3 of the command 20 is set to the first option. By transmitting the operation control command 20 of this example to the controller 6, the designated operation completion time is made valid to only the commands of the specific command type for the specific LUN which are sent by the host computer.

Figure 11A:
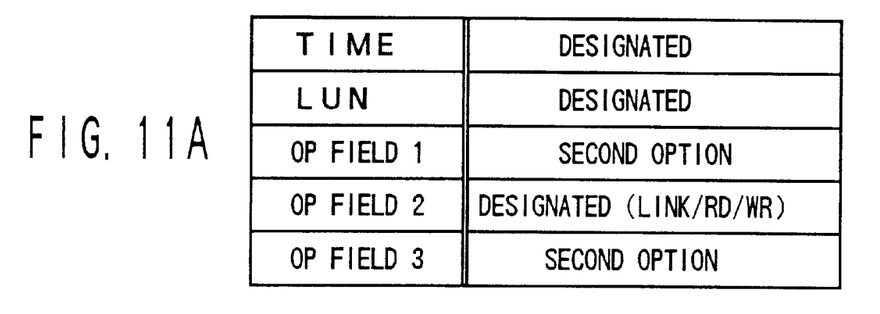
FIG. 11A, FIG. 11B and FIG. 11C are diagrams for explaining other examples of the control parameters of the operation control command.
Figure 11B:
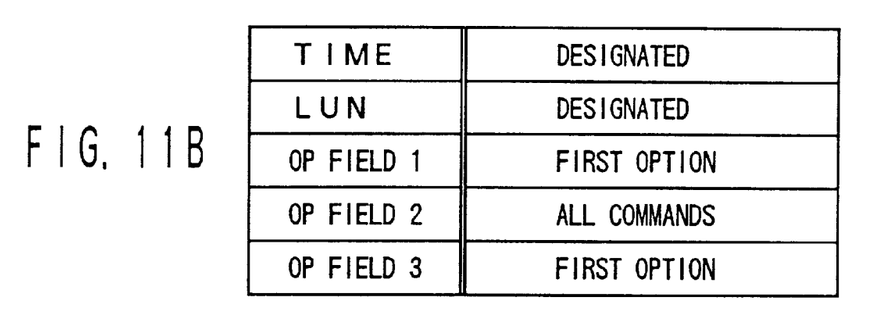
Figure 11C:
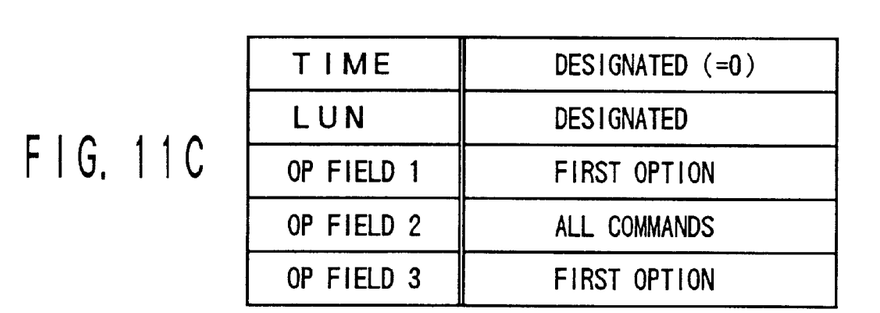

FIG. 11A, FIG. 11B and FIG. 11C show other examples of the control parameters of the operation control command in order to explain the functions of the command execution monitoring system and method of the present invention.

In the example of FIG. 11A, the second option that the operation of the commands of the designated command type is done just at the designated operation completion time, can be set to the controller 6 by using the control parameters of the operation control command 20 sent by the host computer. The operation completion time in the field 21 of the command 20 is designated to a specific time according to the request of the user. The LUN designation in the field 22 of the command 20 is set at a specific LUN. The first operation designation in the field 23-1 of the command 20 is set to the second option. The second operation designation in the field 23-2 of the command 20 is set to a specific command type.

The third operation designation in the field 23-3 of the command 20 is set to the second option. By transmitting the operation control command 20 of this example to the controller 6, the designated second option is made valid to the commands of the specific type for the specific LUN sent by the host computer.

In the example of FIG. 11B, a specific time-out period for the host computer can be set to any previous command entry in the controller 6 by using the control parameters of the operation control command 20 sent by the host computer. The operation completion time in the field 21 of the command 20 is designated to a specific time according to the request of the user. The LUN designation in the field 22 of the command 20 is set at a specific LUN. The first operation designation in the field 23-1 of the command 20 is set to the first option. The second operation designation in the field 23-2 of the command 20 is set to all the commands. The third operation designation in the field 23-3 of the command 20 is set to the first option. By transmitting the operation control command 20 of this example to the controller 6, the designated operation completion time is made valid to any previous command entry for the specific LUN existing in the command status table 30 before the receipt of the command 20 by the controller 6.

In the example of FIG. 11C, any previous command entry for the designated LUN in the controller 6 can be forcefully terminated by using the control parameters of the operation control command 20 sent by the host computer. The operation completion time in the field 21 of the command 20 is designated to zero. The LUN designation in the field 22 of the command 20 is set at a specific LUN. The first operation designation in the field 23-1 of the command 20 is set to the first option. The second operation designation in the field 23-2 of the command 20 is set to all the commands. The third operation designation in the field 23-3 of the command 20 is set to the first option. By transmitting the operation control command 20 of this example to the controller 6, any previous command entry for the specific LUN existing in the command status table 30 before the receipt of the command 20 is forcefully terminated.

According to the above-described embodiments, the user or the program on the host computer can transmit the operation control command wherein the control parameters (for example, a timeout period for the host computer) are set at arbitrary values according to the request of the user, to the command execution monitoring system at the same time as the issue of an I/O request to the I/O devices. It is possible for the command execution monitoring system and method of the above-described embodiments to effectively monitor the execution of the I/O command for the I/O devices in accordance with the designated control parameters of the operation control command.

Further, according to the abovedescribed embodiments, it is possible to avoid the transmission of an I/O request error to the host computer before the execution of the command for the I/O device is complete. The command execution monitoring system and method of the above-described embodiments is effective in providing flexibility and reliability of the monitoring of the command execution for a computer system which include various host computers sharing the I/O devices.

Further, the present invention is not limited to the above-described embodiments, and variations and modifications may be made without departing from the scope of the present invention.

The present invention is based on Japanese priority application No. 9-361171, filed on Dec. 26, 1997, the entire contents of which are hereby incorporated by reference.

What is claimed is:

1. A method of monitoring execution of input/output commands for input/output devices based on a time-out period of each of a plurality of host computers sharing the input/output devices, comprising the steps of:

retaining control parameters of an operation control command sent by one of the host computers, the control parameters including an operation completion time;

sequentially receiving command entries sent for the devices by the host computers and retaining the command entries in a table, each entry including a relative elapsed time measured from a time the entry is retained in the table; and setting a time-out period of said one of the host computers, the time-out period being the operation completion time, so that execution of each of the entries in the table is monitored based on a comparison between each of the relative elapsed times of the entries and the operation completion time, wherein the control parameters retained in the retaining step include an operation designation, and the operation designation is indicative of a command type of the command entries in the table to which the operation completion time applies.

2. The method according to claim 1, wherein the control parameters retained in the retaining step include a logical unit number LUN designation, and the LUN designation is indicative of a specific one of the devices to which the operation completion time is valid.

3. The method according to claim 1, wherein the control parameters retained in the retaining step include an operation designation, and the operation designation is indicative of a first option that the operation completion time is made valid to any previous command entry existing in the table before a time the control parameters are retained, or a second option that the operation completion time is made valid to all the command entries retained in the table irrespective of the time the control parameters are retained.

4. The method according to claim 1, wherein, in the sequential receiving step, command entries sent by the host computers are sequentially received and the command entries are retained in different tables corresponding to the individual host computers, such that execution of each of the entries in a corresponding one of the tables for a specific one of the host computers is monitored based on a comparison between each of the relative elapsed times of the entries and the operation completion time sent by the specific host computer.

5. The method according to claim 1, further comprising the steps of:

detecting whether a time-out event has occurred in the entries of the table, based on the comparison between each of the relative elapsed times of the entries and the operation completion time;

notifying a related one of the host computers of occurrence of a time-out error for a related command of the entries of the table when the occurrence of the time-out event is detected by the detecting step; and scheduling execution of a selected one from the entries of the table when the occurrence of the time-out event is not detected by the detecting step.

6. The method according to claim 5, wherein, when one of the control parameters of the operation control command indicates an option that operation of the input/output commands should be done within the operation completion time, the scheduling step selects one of the entries of the table that has a maximum relative elapsed time.

7. The method according to claim 5, wherein, when one of the control parameters of the operation control command indicates an option that operation of the input/output commands should be done just at the operation completion time, the scheduling step selects one of the entries of the table that has a relative elapsed time equal to the operation completion time.

8. The method according to claim 5, wherein, when one of the control parameters of the operation control command indicates a specific command type, the scheduling step selects one of the entries of the table that meets the command type.

9. The method according to claim 5, wherein, in the receiving step, command entries sent by the host computers are sequentially received and the command entries are retained in different tables corresponding to the individual host computers, and, in the scheduling step, execution of each of the entries in a corresponding one of the tables for a specific one of the host computers is scheduled.

10. A system for monitoring execution of input/output commands for input/output devices based on a time-out period of each of a plurality of host computers sharing the input/output devices, comprising:

a first unit for retaining control parameters of an operation control command sent by one of the host computers, the control parameters including an operation completion time;

a second unit for sequentially receiving command entries sent for the devices by the host computers and retaining the command entries in a table, each entry including a relative elapsed time measured from a time the entry is retained in the table; and a third unit for setting a time-out period of said one of the host computer, the time-out period being the operation completion time retained by the first unit, so that execution of each of the entries in the table of the second unit is monitored based on a comparison between each of the relative elapsed times of the entries and the operation completion time, wherein the control parameters retained by the first unit include an operation designation, and the operation designation is indicative of a command type of the command entries in the table to which the operation completion time applies.

11. The system according to claim 10, wherein the control parameters retained by the first unit include a logical unit number LUN designation, and the LUN designation is indicative of a specific one of the devices to which the operation completion time is valid.

12. The system according to claim 10, wherein the control parameters retained by the first unit include an operation designation, and the operation designation is indicative of a first option that the operation completion time is made valid to any previous command entry existing in the table before a time the control parameters are retained, or a second option that the operation completion time is made valid to all the command entries retained in the table irrespective of the time the control parameters are retained.

13. the system according to claim 10, wherein the second unit sequentially receives command entries sent by the host computers and retains the command entries in different tables corresponding to the individual host computers, such that execution of each of the entries in a corresponding one of the tables for a specific one of the host computers is monitored based on a comparison between each of the relative elapsed times of the entries and the operation completion time sent by the specific host computer.

14. The system according to claim 10, wherein the third unit includes:

a detection unit for detecting whether a time-out event has occurred in the entries of the table of the second unit, based on the comparison between each of the relative elapsed times of the entries and the operation completion time;

an error notification unit for notifying a related one of the host computers of occurrence of a time-out error for a related command of the entries of the table when the occurrence of the time-out event is detected by the detection unit; and an execution schedule unit for scheduling execution of a selected one from the entries of the table when the occurrence of the time-out event is not detected by the detection unit.

15. The system according to claim 14, wherein, when one of the control parameters of the operation control command indicates an option that operation of the input/output commands should be done within the operation completion time, the execution schedule unit selects one of the entries of the table that has a maximum relative elapsed time.

16. The system according to claim 14, wherein, when one of the control parameters of the operation control command indicates an option that operation of the input/output commands should be done just at the operation completion time, the execution schedule unit selects one of the entries of the table that has a relative elapsed time equal to the operation completion time.

17. The system according to claim 14, wherein, when one of the control parameters of the operation control command indicates a specific command type, the execution schedule unit selects one of the entries of the table that meets the command type.

18. The system according to claim 14, wherein the second unit sequentially receives command entries sent by the host computers and retains the command entries in different tables corresponding to the individual host computers, and the execution schedule unit schedules execution of each of the entries in a corresponding one of the tables for a specific one of the host computers.

* * * * *